United States Patent
Kelley et al.

(10) Patent No.: US 9,880,991 B2
(45) Date of Patent: Jan. 30, 2018

(54) TRANSPOSING TABLE PORTIONS BASED ON USER SELECTIONS

(71) Applicant: International Business Machines Corporation, Armonk, NY (US)

(72) Inventors: John F. Kelley, Clarkesville, GA (US); Robert J. Torres, Colleyville, TX (US)

(73) Assignee: International Business Machines Corporation, Armonk, NY (US)

(*) Notice: Subject to any disclaimer, the term of this patent is extended or adjusted under 35 U.S.C. 154(b) by 547 days.

(21) Appl. No.: 13/653,720

(22) Filed: Oct. 17, 2012

(65) Prior Publication Data

US 2014/0108906 A1    Apr. 17, 2014

(51) Int. Cl.
  *G06F 17/30*  (2006.01)
  *G06F 17/18*  (2006.01)
  *G06F 17/24*  (2006.01)

(52) U.S. Cl.
  CPC ................... *G06F 17/245* (2013.01)

(58) Field of Classification Search
  CPC ............ G06F 17/00; G06F 17/18; G06F 17/30
  USPC .......................................................... 715/227
  See application file for complete search history.

(56) References Cited

U.S. PATENT DOCUMENTS

| | | | | |
|---|---|---|---|---|
| 5,416,895 A | * | 5/1995 | Anderson et al. | 715/209 |
| 5,461,708 A | * | 10/1995 | Kahn | 345/440 |
| 5,933,796 A | * | 8/1999 | Ashida et al. | 702/181 |
| 7,216,291 B2 | | 5/2007 | Kim | |
| 7,454,383 B2 | * | 11/2008 | Keyes et al. | 705/38 |
| 7,614,006 B2 | * | 11/2009 | Molander | G06F 17/246 707/999.007 |
| 7,685,510 B2 | | 3/2010 | Sauermann | |
| 7,782,321 B2 | * | 8/2010 | Nemoto et al. | 345/440 |
| 8,019,771 B2 | | 9/2011 | Iwao | |
| 8,060,817 B2 | | 11/2011 | Goldberg et al. | |
| 8,151,213 B2 | * | 4/2012 | Weitzman et al. | 715/815 |
| 8,239,265 B2 | | 8/2012 | Patwa et al. | |

(Continued)

OTHER PUBLICATIONS

Jeff Davis, Transpose Excel data from rows to columns, or vice versa, Jun. 22 2009, http://www.techrepublic.com/blog/microsoft-office/transpose-excel-data-from-rows-to-columns-or-vice-versa/, transpose excel.pdf, pp. 1-2.*

(Continued)

*Primary Examiner* — Scott Baderman
*Assistant Examiner* — Sookil Lee
(74) *Attorney, Agent, or Firm* — Christopher McLane

(57) ABSTRACT

Embodiments of the present invention disclose a method, computer program product, and system for displaying tabular data. A computing device identifies a plurality of data elements organized in a first plurality of rows and a first plurality of columns, wherein the first plurality of rows and the first plurality of columns are at least partially displayed. The computing device receives a data selection spanning an entire row or an entire column included in the first plurality of rows or the first plurality of columns. The computing device, in response to receiving the data selection spanning an entire row or an entire column included in the first plurality of rows or the first plurality of columns, determines a statistical relationship included in the data selection. The computing device, in response to determining the statistical relationship, displays at least a portion of the data selection.

15 Claims, 5 Drawing Sheets

(56) References Cited

U.S. PATENT DOCUMENTS

| | | | |
|---|---|---|---|
| 8,479,089 B2* | 7/2013 | Yucel et al. | 715/212 |
| 8,812,482 B1* | 8/2014 | Kapoor et al. | 707/713 |
| 9,047,283 B1* | 6/2015 | Zhang | G06F 17/30663 |
| 2003/0229848 A1* | 12/2003 | Arend et al. | 715/509 |
| 2005/0021286 A1* | 1/2005 | Kunce | 702/179 |
| 2006/0117253 A1 | 6/2006 | Polash | |
| 2007/0078889 A1* | 4/2007 | Hoskinson | G06F 17/30705 |
| 2008/0010615 A1* | 1/2008 | Curtis | G06F 17/30873 715/846 |
| 2008/0059897 A1* | 3/2008 | DiLorenzo | G06F 17/30719 715/764 |
| 2008/0071929 A1* | 3/2008 | Motte | G06F 17/3089 709/246 |
| 2008/0072145 A1* | 3/2008 | Blanchard | G06F 17/22 715/273 |
| 2008/0092054 A1* | 4/2008 | Bhumkar | G06F 17/30899 715/739 |
| 2008/0133488 A1* | 6/2008 | Bandaru | G06F 17/30864 |
| 2008/0270942 A1* | 10/2008 | Petersen et al. | 715/840 |
| 2009/0009517 A1* | 1/2009 | Palmer | 345/440 |
| 2009/0100370 A1* | 4/2009 | Martone et al. | 715/777 |
| 2009/0119156 A1* | 5/2009 | Dulepet | G06Q 30/0201 705/7.29 |
| 2009/0182727 A1* | 7/2009 | Majko | G06F 17/30554 |
| 2009/0327208 A1* | 12/2009 | Bittner et al. | 706/61 |
| 2010/0005083 A1* | 1/2010 | Morgana | G06F 17/30616 707/E17.008 |
| 2010/0030552 A1* | 2/2010 | Chen | G06F 17/30734 704/9 |
| 2010/0070491 A1* | 3/2010 | Cragun et al. | 707/722 |
| 2010/0250340 A1* | 9/2010 | Lee | G06Q 10/06 705/310 |
| 2010/0268773 A1 | 10/2010 | Hunt et al. | |
| 2011/0040562 A1* | 2/2011 | Doyle | G11B 27/322 704/251 |
| 2011/0296345 A1* | 12/2011 | Friedman | G06F 17/30994 715/811 |
| 2012/0271748 A1* | 10/2012 | DiSalvo | 705/37 |
| 2012/0303637 A1* | 11/2012 | Carmel | G06F 17/241 707/749 |
| 2013/0198165 A1* | 8/2013 | Cheng et al. | 707/714 |
| 2013/0232263 A1* | 9/2013 | Kelly | H04L 43/10 709/224 |
| 2013/0259362 A1* | 10/2013 | Ghosh | G06F 17/30716 382/162 |

OTHER PUBLICATIONS

Muhammad Abulaish, A Web content Mining Approach for Tag Cloud Generation, Dec. 5, 2011, Tag cloud generation.pdf, pp. 52-59.*
Nathan, Transposing Non-contiguous Cells, Feb. 2, 2008, http://en.allexperts.com/q/Excel-1059/2008/2/Transposing-Non-contiguous-Cells.htm, Non-contiguous cells.pdf, pp. 1-2.*
pirate.shu.edu, 6.1 Correlation between Variables, Jan. 6, 2006, https://web.archive.org/web/20060110142150/http://pirate.shu.edu/~wachsmut/Teaching/MATH1101/Relations/correlation.html, correlation.pdf, pp. 1-4.*
Yang Song, Jul. 24, 2008, Real-time Automatic Tag Recommendation.pdf, pp. 515-522.*
Weiwei Cui, Aug. 6, 2010, Context Preserving Dynamic World Cloud Visualization.pdf, pp. 121-128.*
Cedric Mesnage, Jan. 2010, Piloted Search and Recommendation with Social Tag Cloud-Based Navigation.pdf, pp. 1-8.*
Wikipedia, Jul. 15, 2011, Correlation and dependence.pdf, https://web.archive.org/web/20110716032708/http://en.wikipedia.org/wiki/Correlation_and_dependence, pp. 1-7.*
Excel 2007, 2007, Sort data in a range or table.pdf, https://support.office.com/en-us/article/Sort-data-in-a-range-or-table-62d0b95d-2a90-4610-a6ae-2e545c4a4654, pp. 9-11.*
Elizabeth Mott, Oct. 14, 2012, How to Reconfigure.pdf, https://web.archive.org/web/20121014001844/http://smallbusiness.chron.com/reconfigure-horizontal-row-vertical-column-excel-48628.html, pp. 1-3.*

* cited by examiner

TRANSPOSING TABLE PORTIONS BASED ON USER SELECTIONS

FIELD OF THE INVENTION

The present invention relates generally to the field of displaying tabular data and more particularly to displaying statistical relationships inherent within tabular data.

BACKGROUND OF THE INVENTION

Tabular data is data that may be presented in a table format. A table is a multi-dimensional data structure that organizes tabular data in a series of cells arranged in a multi-dimensional matrix of horizontal rows and vertical columns for data analysis, where each cell contains alphanumeric values. The number of horizontal rows and vertical columns that a table may contain is determined by the number of variables and amount of tabular data to be included therein. The amount of tabular data that a user may view at once is determined by the screen size of their computer display device, for example, a monitor or screen, or a Graphical User Interface (GUI) that the table is displayed in. In instances where the amount of tabular data exceeds the viewing space of the display, a user may scroll or move the tabular data so that the full extent of the table can be visualized. For example, GUI windows typically provide vertical and horizontal scroll bars, providing an intuitive graphical means for scrolling the displayed view of a table.

Tabular data is often analyzed by a user to determine relationships between disparate tabular data types, for example, by using regression analysis (to determine significance) and correlation analysis (to determine linear associations). There is often a desire by a user of the tabular data to extract information and transform it into an understandable structure for further use. Such analysis may require that the user scroll back and forth as well as up and down to gather the data for analysis and then transfer that data to another program or table where analysis will take place. Known, and commercially available, computer software can tabulate and analyze data.

SUMMARY

Embodiments of the present invention disclose a method, computer program product, and system for displaying tabular data. A computing device identifies a plurality of data elements organized in a first plurality of rows and a first plurality of columns, wherein the first plurality of rows and the first plurality of columns are at least partially displayed. The computing device receives a data selection spanning an entire row or an entire column included in the first plurality of rows or the first plurality of columns. The computing device, in response to receiving the data selection spanning an entire row or an entire column included in the first plurality of rows or the first plurality of columns, determines a statistical relationship included in the data selection. The computing device, in response to determining the statistical relationship, displays at least a portion of the data selection.

BRIEF DESCRIPTION OF THE SEVERAL VIEWS OF THE DRAWINGS

FIG. 2A illustrates an example of a tabular data program displaying tabular data, in accordance with an embodiment of the present invention.

FIG. 2B illustrates a transposed view of a subset of data entries included in the tabular data of FIG. 2A, in accordance with an embodiment of the present invention.

DETAILED DESCRIPTION

Figure 1:
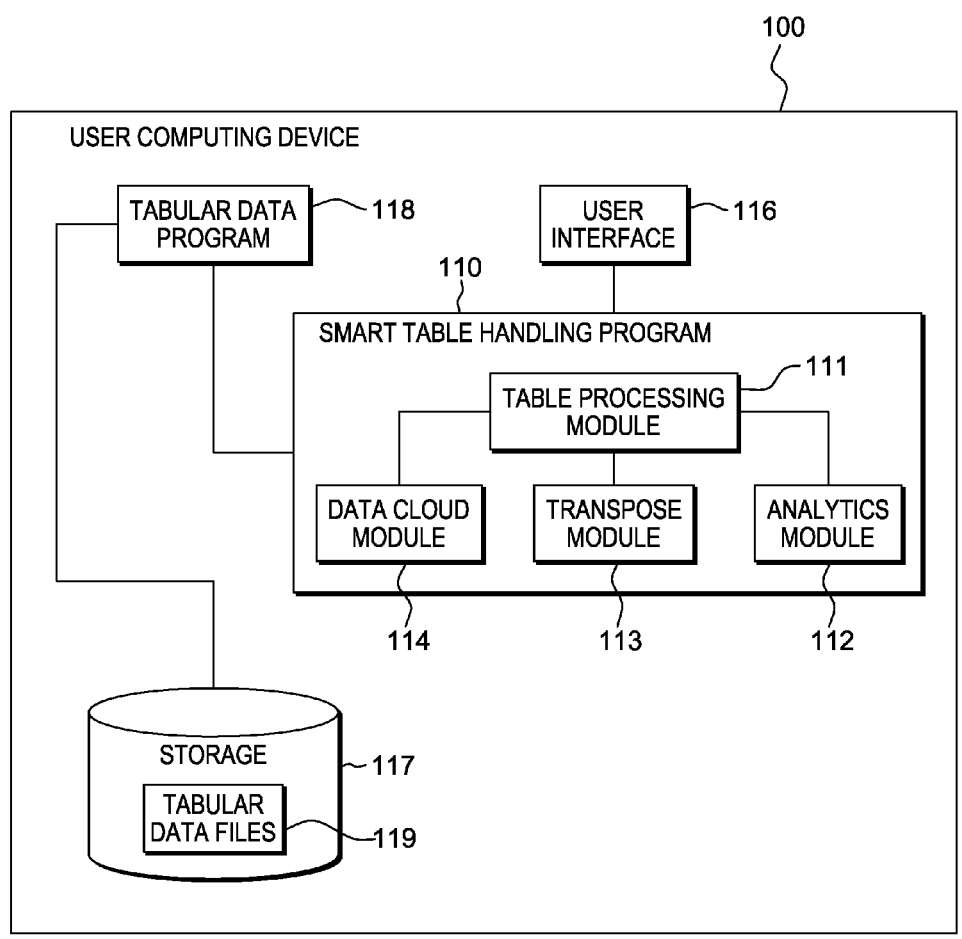
FIG. 1 is a functional block diagram illustrating a computing device, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions, which execute on the computer or other programmable apparatus, provide processes for implementing the functions/acts specified in the flowchart and/or block diagram block or blocks.

The present invention will now be described in detail with reference to the Figures. FIG. 1 is a functional block diagram illustrating a computing device, generally designated 100, in accordance with one embodiment of the present invention. Computing device 100 may be a server computer, client computer, notebook computer, laptop computer, a tablet computer, a handheld device or smart phone, a thin client, or any other electronic device or computing system capable of receiving input from a user, performing computational operations, displaying data, and executing program instructions. In another embodiment, computing device 100 may represent a computing system utilizing clustered computers and components to act as a single pool of seamless resources when accessed through a network. In yet another embodiment, computing device 100 may represent a computer system utilizing cloud computing resources to act as a single pool of seamless resources when accessed through a network. This is a common implementation for data centers and cloud computing applications. Computing device 100 may include internal and external hardware components, as depicted and described in further detail with respect to FIG. 3.

Computing device 100 includes user interface 116, tabular data program 118, storage 117, and smart table handling program 110. User interface 116 (discussed in more detail below) is associated with computing device 100 and allows a user to access and manipulate smart table handling program 110 and tabular data (e.g. tabular data files 119) displayed by tabular data program 118 or any other program capable of displaying and/or manipulating tabular data. User interface 116 typically is a graphical user interface (GUI) that is displayed on a display screen, such as display 420 (see FIG. 4). User interface 116 may also include navigation menus and other graphical elements that a user may utilize, via, for example, a keyboard, keypad, a touch screen, audio and/or some other suitable input device. Tabular data program 118 and smart table handling program 110 may use input received via user interface 116 to perform data analysis tasks, as described below, in accordance with embodiments of the invention. In another embodiment, user interface 116 may be a textual user interface. In general, user interface 116 may be any user interface, for example, a mouse, keyboard, speech/sound based, or touch-screen display, that allows a user to generate signals sufficient to access and manipulate smart table handling program 110 and tabular data program 118.

In preferred embodiments of the invention, tabular data program 118 can be any computer program capable of displaying multi-dimensional tabular data, for example, tabular data files 119. Though tabular data program 118 is depicted as residing on computing device 100, in other embodiments, tabular data program 118 may reside on any computing device capable of communicating with computing device 100 via, for example, a wired or wireless network (not shown). Tabular data program 118 may access storage 117, retrieve data elements capable of being displayed in cells arranged in a multi-dimensional matrix of a plurality of horizontal rows and a plurality of vertical columns, for example, tabular data files 119, and display the retrieved tabular data in cells arranged in a multi-dimensional matrix of one or more horizontal rows and one or more vertical columns. In a preferred embodiment, tabular data included in each row may be associated, for example, with a plurality of data elements pertaining to a particular client; and the tabular data included in each column may be related by type or category and displayed under a column heading, for example "Hours Worked." In general, tabular data program 118 may be any program capable of displaying tabular data in cells arranged in a multi-dimensional matrix of one or more horizontal rows and one or more vertical columns, for example, accounting programs, spreadsheet programs, and database programs.

In preferred embodiments of the invention, smart table handling program 110, the operation of which is explained in greater detail below with respect to FIG. 3, operates to determine relationships that exist within the tabular data. Smart table handling program 110 may, in one embodiment, include table processing module 111, transpose module 113, analytics module 112, and data cloud module 114. Furthermore, smart table handling program 110 may determine statistical relationships, for example, significance levels and linear associations, and at least partially display tabular data in a manner indicative of the determinations such that the data and their statistical relationships may be easily understood by a user. For example, smart table handling program 110 may reduce the need for a user to scroll through a table to view tabular data contained in the non-viewable portion of user interface 116. Further still, smart table handling program 110 may normalize tabular data, and order tabular data by significance. In general, tabular data program 118 may operate to determine relationships between data types contained in the tabular data.

Table processing module 111 operates generally to monitor data selection signals generated by user interface 116, in accordance with an embodiment of the present invention. Further, table processing module 111 may be included in smart table handling program 110 and may utilize analytics module 112, transpose module 113, and data cloud module 114. Table processing module 111 may, in response to determining that an appropriate data selection signal has been generated by user interface 116 within the viewable space of tabular data program 118, initiate the manipulation of tabular data, for example, a data vector spanning a row or a column included in tabular data files 119, at least partially displayed by tabular data program 118, in accordance with an embodiment of the invention.

In a preferred embodiment of the invention, analytics module 112 operates generally to determine statistical relationships present in tabular data. Analytics module 112 can be included in smart table handling program 110 and may perform the following functions: determine an independent variable, for example, by prompting a user to select a dependent variable; determine significance levels of relationships that may be present between the independent variables relative to the user-defined dependant variable (regression analysis); and determine linear and non-linear associations between variables (correlation analysis). Table processing module 111 may monitor user generated input signals generated by user interface 116 to determine which rows a user selects.

Transpose module 113 operates generally to transpose tabular data, in accordance with a preferred embodiment of the present invention. Transpose module 113 may be included in smart table handling program 110. Further, transpose module 113 may be called by the table processing module 111 in response to table processing module 111 determining that user interface 116 generated a signal communicating that one or more rows have been selected.

In a preferred embodiment of the invention, data cloud module 114 operates generally to display variable headings in a window in a manner that communicates a relationship that exist between the data included in the variable headings. Data cloud module 114 may be included in smart table handling program 110. Further, data cloud module 114 may be called by table processing module 111 in response to table processing module 111 determining a desire to view a variable cloud of column headings included in tabular data files 119.

Figures 2A, 2B:
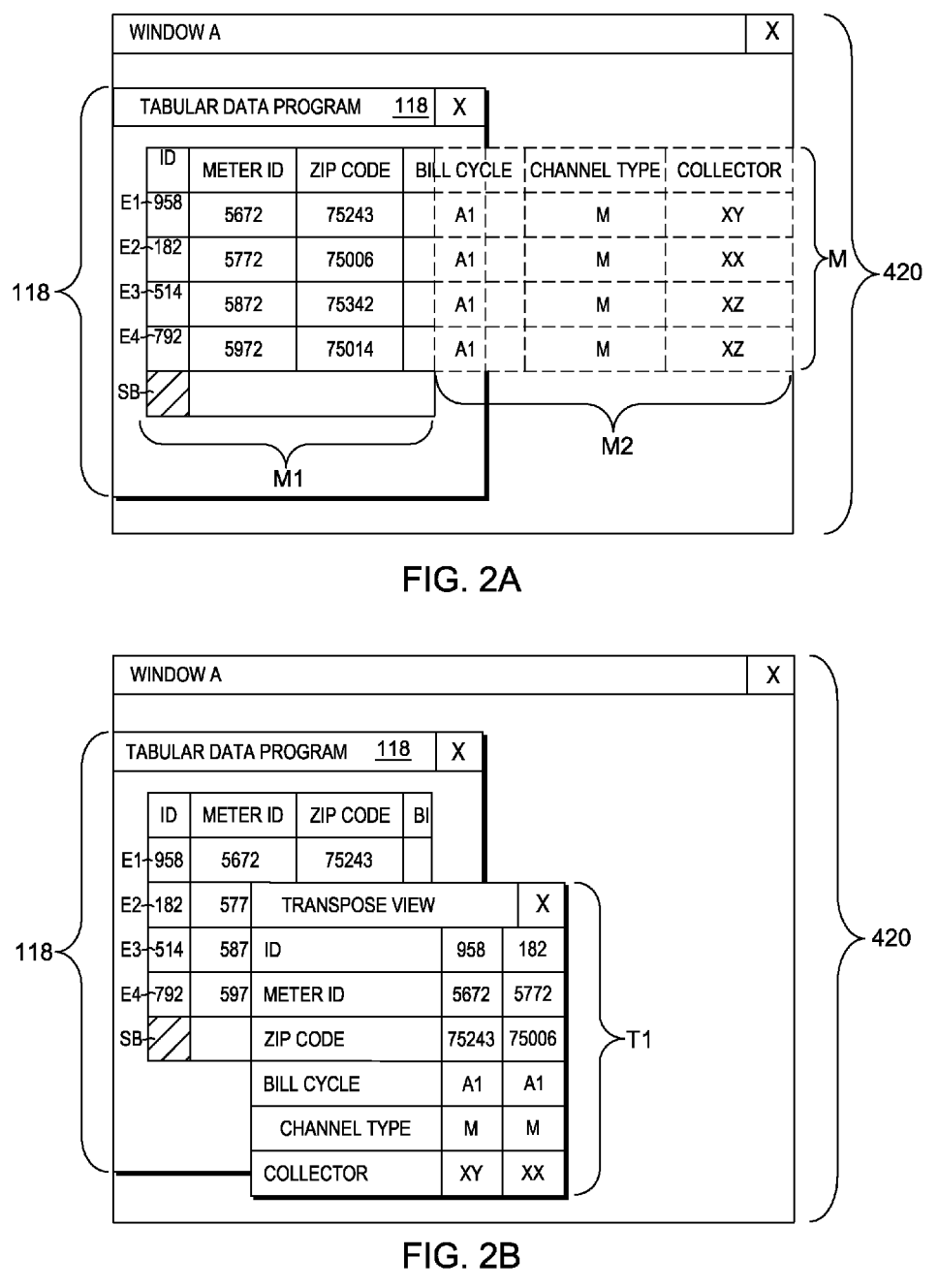
Figure 2C:
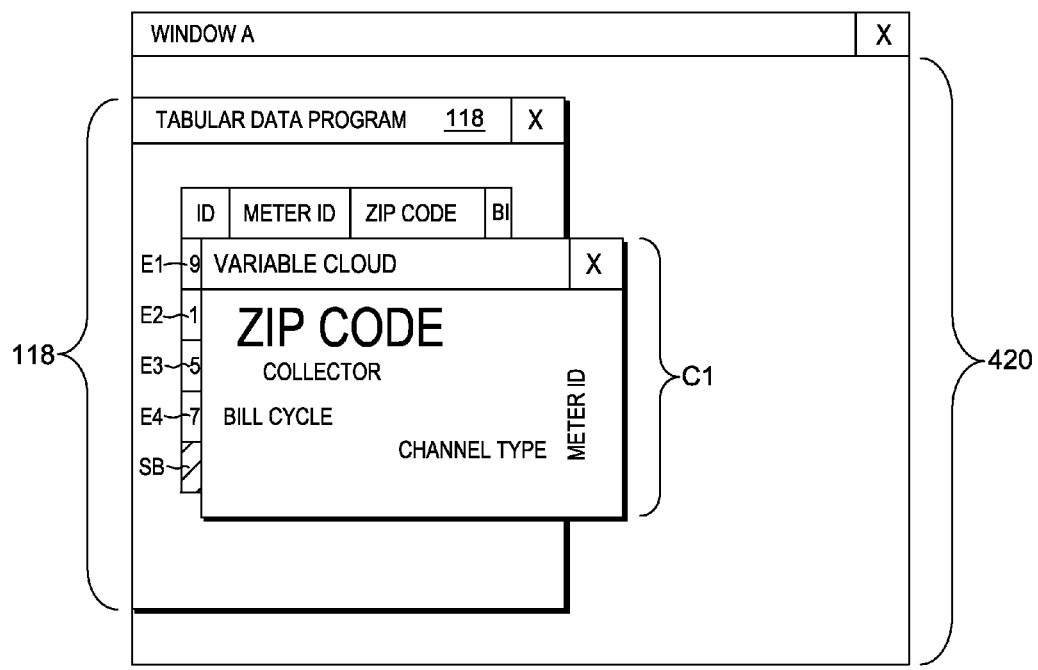
FIG. 2C illustrates a variable cloud window depicting a subset of the column headings of the matrix of FIG. 2A, in accordance with an embodiment of the present invention.
Figure 3:
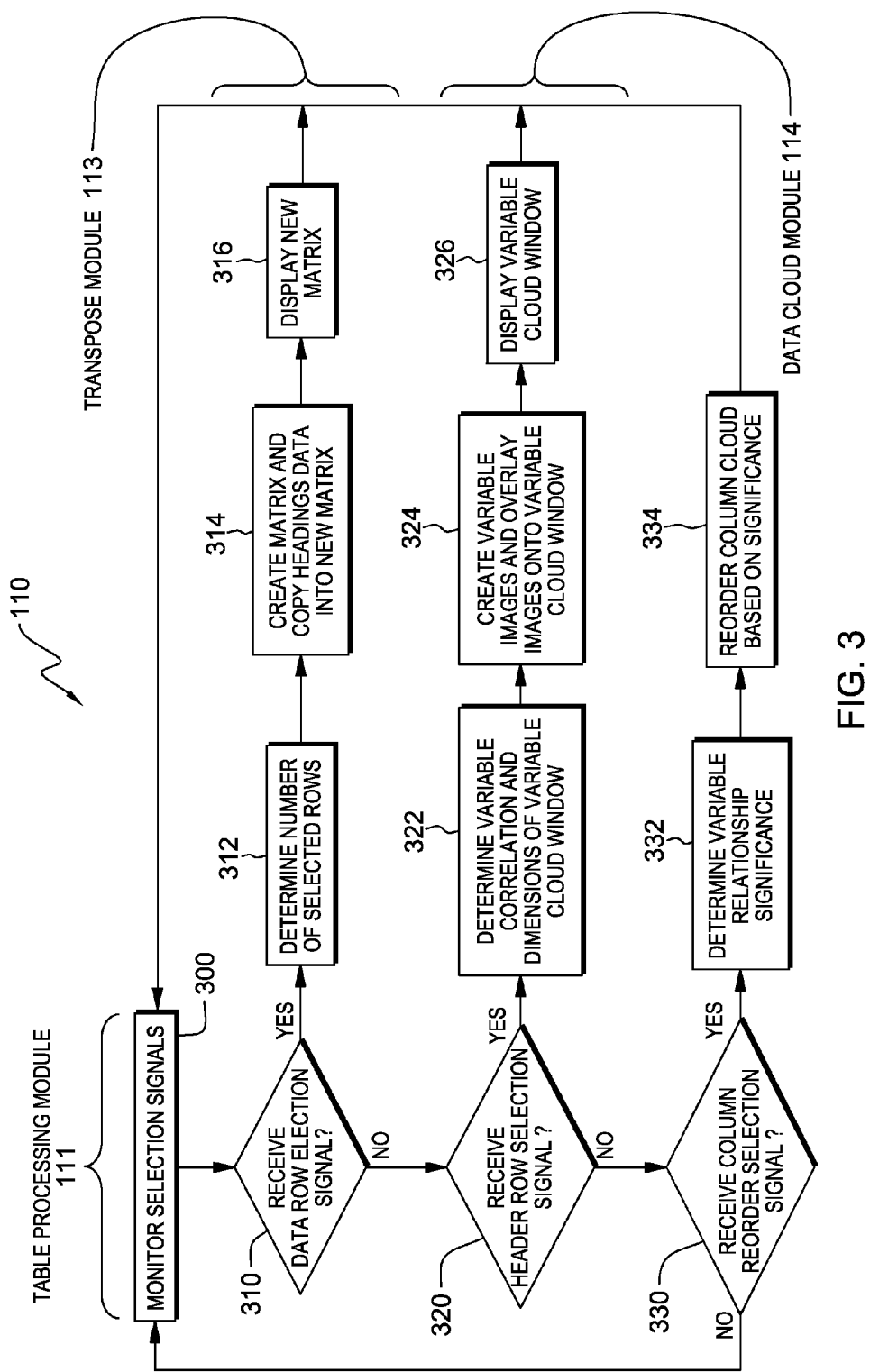
FIG. 3 is a flowchart depicting the operational steps of a smart table handling program, on a computing device within the smart table handling environment of FIG. 1, for analyzing and displaying tabular data, in accordance with an embodiment of the present invention.

Turning now to FIGS. 2A, 2B, and 2C, these figures are provided to introduce concepts that will be used further in the discussion of FIG. 3, in the context of smart table handling environment 100 of FIG. 1. FIG. 2A illustrates an example of tabular data program 118 displaying tabular data files, for example, in user interface 116, that extend beyond the dimensions of the window used to display tabular data program 118, in accordance with a preferred embodiment of the present invention. FIG. 2B illustrates an exemplary transposed view of a subset of the tabular data of FIG. 2A, in accordance with a preferred embodiment of the present invention. FIG. 2C illustrates an exemplary variable cloud window of the column headings of FIG. 2A, in accordance with a preferred embodiment of the present invention.

Turning now to FIG. 2A, this figure is a screenshot of user interface 116; specifically, FIG. 2A illustrates an example of tabular data program 118 displaying tabular data files 119 in matrix M, in accordance with an embodiment of the present invention. Window A is positioned in the background relative to tabular data program 118 and contains displayed content, although window A is partially obscured by tabular data program 118. Tabular data program 118 may retrieve tabular data files 119 from storage 117, all depicted in FIG. 1. Matrix M includes a column headings row that contains a column for each of the seven variables included in tabular data files 119, for example, "ID," "METER ID," "ZIP CODE," "BILL CYCLE," "CHANNEL TYPE," and "COLLECTOR." Further, matrix M also includes a separate row for entries E1, E2, E3, and E4. Tabular data program 118 displays data associated with a particular variable in a unique column. However, due to the volume of data included in tabular data files 119 and the dimensions of the viewable space of the window displaying tabular data program 118, tabular data files 119 can not be viewed in its entirety without scrolling through the data using scroll bar SB or other similar elements. The M1 portion of matrix M reflects that only tabular data associated with variables "ID," "METER ID," and "ZIP CODE" are able to be completely displayed within the window containing tabular data program 118, resulting in variables "BILL CYCLE," "CHANNEL TYPE," and "COLLECTOR" (contained in the M2 portion of matrix M) extending into the non-viewable portion of the window containing tabular data program 118.

FIG. 2B illustrates transposed view T1 of a subset of the data entries included in tabular data files 119 of FIG. 2A, in accordance with an embodiment of the present invention. In this example, smart table handling program 110 generates transposed view T1 by: receiving a user selection of two data vectors spanning the rows that include data entries E1 and E2 are selected for transposed viewing; creating transpose view T1 as a two-dimensional matrix of three columns and six rows; copying the column headings included in tabular data files 119 into a column of transpose view T1 and the data associated with entries E1 and E2 into the subsequent columns of transpose view T1; and displaying transposed view T1 in a new window in the foreground.

FIG. 2C illustrates variable cloud window C1 depicting a subset of the column headings of matrix M described in FIG. 2A, in accordance with an embodiment of the present invention. Smart table handling program 110 generates variable cloud window C1 in response to receiving a user selection of a row header. In response to said determination, smart table handling program 110 utilizes the column headings and tabular data displayed in matrix M to determine linear relationships present therein and generated variable cloud window C1 based on said determination. In this particular example, smart table handling program 110 determines that variable "ZIP CODE" is the variable with the greatest linear relationship value with variable "ID" of all the variables depicted in FIG. 2A and displays variable "ZIP CODE" with the largest font size to reflect that determination. In the same vein, smart table handling program 110 determines that variable "METER ID" has no linear relationship with variable "ID" and displays the variable "METER ID" with a vertical orientation to reflect that determination.

FIG. 3 is a flowchart depicting the operational steps of smart table handling program 110 for analyzing and displaying tabular data, in accordance with an embodiment of the present invention. In various embodiments, tabular data program 118 may access storage 117, retrieve tabular data files 119, and display the retrieved tabular data, as discussed in FIG. 2A above. Smart table handling program 110 monitors user selection signals (step 300). For example, smart table handling program 110 may monitor signals generated by user interface 116, for example, signals generated by a mouse, keyboard, gesture recognition device and/or software, or touch screen display, while user interface 116 is positioned over the viewable space of the displayed tabular data. Mouse and/or keyboard generated signals may include those signals generated by, for example, left-mouse clicks, right-mouse clicks, key strokes, or any combination thereof.

Subsequent to smart table handling program 110 receiving a selection signal, smart table handling program 110 determines whether the received selection signal is a data row selection signal (step 310). Smart table handling program 110 determines that the received selection signal is a data row selection signal ("yes" branch of decision 310). For example, smart table handling program 110 receives a user selection positioned over a data cell displayed by tabular data program 118. Subsequent to smart table handling program 110 determining that the received selection signal is a row selection signal, smart table handling program 110 determines the number of selected rows included in the row selection (step 312).

In an embodiment, subsequent to smart table handling program 110 determining the number of selected rows, smart table handling program 110 creates a multi-dimensional matrix and copies column headings and tabular data contained in the selected rows into the new multi-dimensional matrix (step 314). For example, smart table handling program 110 may create a multi-dimensional matrix capable of storing the column headings and tabular data included in the user selected row(s) (contiguous and non-contiguous), wherein column headers may be copied into a column of the multi-dimensional matrix and tabular data included in the row selections are copied into other columns of the multi-dimensional matrix, as described above in the discussion of FIG. 2B. Subsequent to smart table handling program 110 creating a multi-dimensional matrix and copying column headings and tabular data into the multi-dimensional matrix, smart table handling program 110 displays the new multi-dimensional matrix in a new window (step 316). In one embodiment, steps 312, 314, and 316 may be performed by transpose module 113. In another embodiment, transpose module 113 may allow for additional analytical actions, for example, determining linear data relationships, determining nonlinear data relationships, normalizing data, displaying columns based on a level correlation between variables, displaying a column cloud, ordering columns based on a level of significance between variables, and viewing a default order of columns.

Subsequent to smart table handling program 110 determining that the received selection signal is not a data row selection signal ("no" branch of decision 310), smart table handling program 110 then determines whether the received selection signal is a header row selection signal (step 320). Smart table handling program 110 determines that the received selection signal is row header selection signal ("yes" branch of decision 320). For example, smart table handling program 110 may determine that the received selection signal was generated by user interface 116 while user interface 116 was located over a row of the tabular data displayed by tabular data program 118 that included column headings. Subsequent to the determination, smart table handling program 110 determines correlation of the variables contained in the selected rows and dimensions of the variable cloud window (step 322). For example, smart table handling program 110 may determine a correlation between a user-selected dependent variable and one or more independent variables contained in the selected rows by determining a correlation coefficient for each of the relationships of the user-selected dependent variable and one or more independent variables. Determination of correlation coefficients is a common statistical technique that measures the extent of a linear association between two variables. Values used to determine a correlation coefficient are typically defined as being between −1 and +1; wherein a correlation coefficient of +1 represents a perfect linear relationship between the variables, a correlation coefficient of −1 represents a perfect negative relationship between the data, and a correlation coefficient of 0 represents no linear relationship between the variables. In general, smart table handling program 110 may determine a correlation coefficient of a user-selected dependent variable and one or more independent variables using any technique that measures a linear association between two variables. In another embodiment, a variable cloud may be a visual representation of linear associations between column headings, wherein the linear association of the values included under a column heading (e.g. independent variable) relative to the values included under a user-determined column heading (e.g. dependent variable) may be shown with a particular font size, and/or using the text of the column headings.

Subsequent to smart table handling program 110 determining a correlation of the variables contained in the selected rows and dimensions of the variable cloud window, smart table handling program 110 creates variable images and overlays those images onto the variable cloud window created in step 322 (step 324). In an embodiment, smart table handling program 110 may create variable images wherein the size of a variable image is based on the correlation coefficient value of that particular variable, for example, where a variable has a correlation coefficient value of 1, its image size may be displayed as being 25% of the variable cloud window height. In another embodiment, smart table handling program 110 may include the correlation value with the displayed variable name. In yet another embodiment, smart table handling program 110 may invert (horizontally or vertically) the displayed variable name where that variable's determined correlation value is negative. In yet another embodiment, smart table handling program 110 may assign hyperlinks for each image to link that particular image to its corresponding tabular data column. Smart table handling program 110 displays the variable cloud window (step 326). In another embodiment, steps 322, 324, and 326 may be performed by data cloud module 114.

Subsequent to smart table handling program 110 determining that the received selection signal is not a header row selection signal ("no" branch of decision 320), smart table handling program 110 then determines whether the received selection signal is a column reorder selection signal (step 330). Smart table handling program 110 determines that the received selection signal is a column reorder selection signal ("yes" branch of decision 330). For example, smart table handling program 110 may determine that the received selection signal was not indicative of a data row selection signal or a column header selection signal. Subsequent to smart table handling program 110 determining that the received selection signal is indicative of a column reorder selection signal, smart table handling program 110 determines the significance of the relationships that exist between the variables included in the selected rows (step 332). For example, smart table handling program 110 may determine the significance of variable relationships included in tabular data file 119. For example, smart table handling program 110 may determine the significance of the variables contained in the selected row by prompting the user to select a dependent variable from the plurality of variables included in tabular data files 119 displayed by tabular data program 118; determine a linear regression of the tabular data included in the selected rows, and determine t-test values of individual variables included in the selected rows. Linear regression is a common statistical technique used to model relationships between a dependent variable and one or more independent variables. Likewise, a t-test is a common statistical technique used to determine statistical significance of said relationships. In general, smart table handling program 110 may determine the statistical significance of tabular data using any technique that is able to assess whether an observation reflects a pattern or relationships between variables contained in any portion of tabular data files 119 rather than just chance. Smart table handling program 110 reorders the columns based on significance (step 334). For example, smart table handling program 110 may create a new two-dimensional matrix (as described above in the discussion of step 314), copy the columns into the new two-dimensional matrix such that columns are presented in decreasing order of the one or more independent variables determined significance value. If smart table handling program 110 determines that the received selection signal is not indicative of a column header selection signal, then smart table handling program returns to monitoring user selection signals ("no" branch of decision 330).

Figure 4:
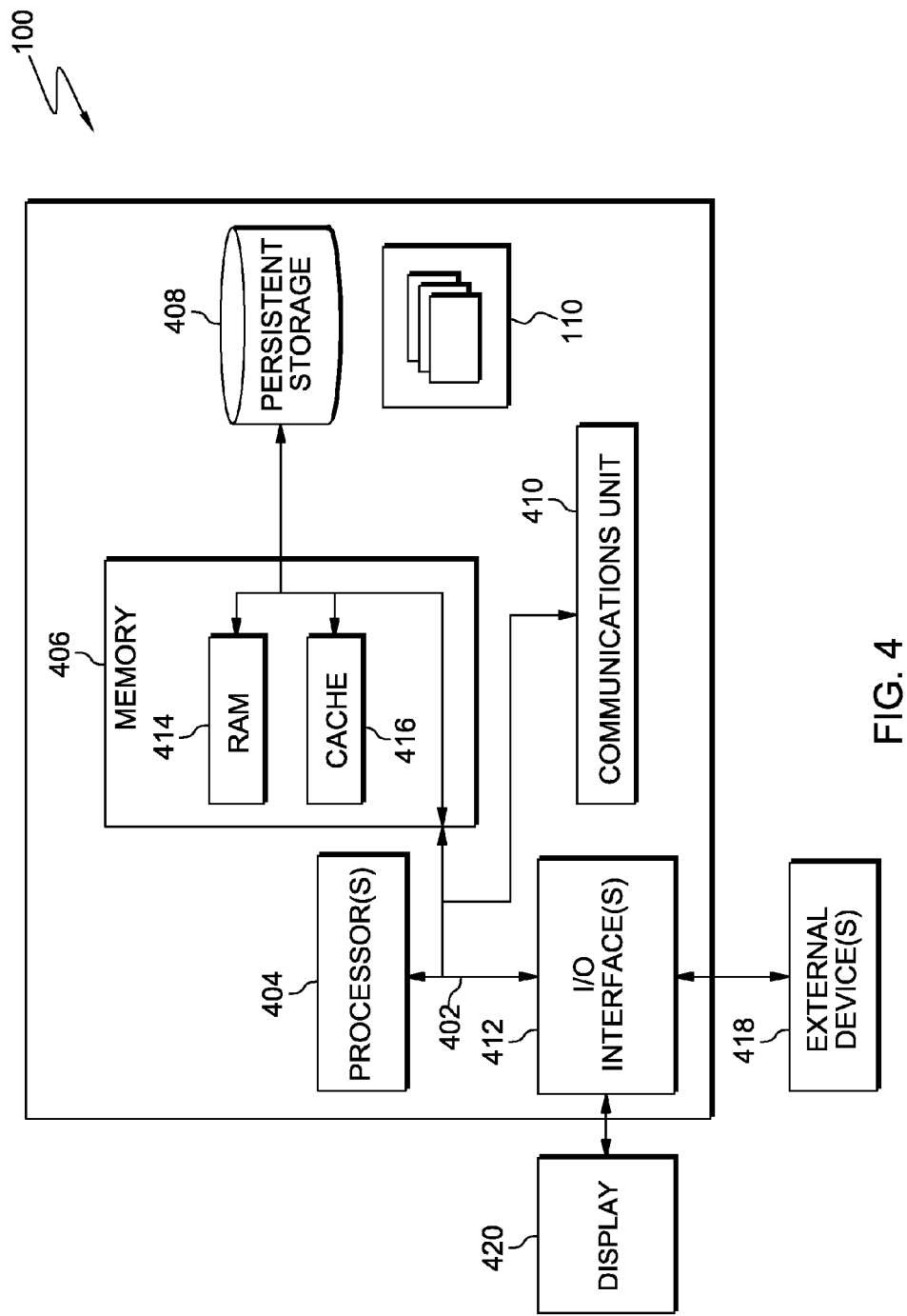
FIG. 4 depicts a block diagram of components of the computing device executing the smart table handling program of FIG. 3, in accordance with an embodiment of the present invention.

FIG. 4 depicts a block diagram of components of computing device 100, in accordance with an illustrative embodiment. It should be appreciated that FIG. 4 provides only an illustration of one implementation and does not imply any limitations with regard to the environment in which different embodiments may be implemented. Many modifications to the depicted environment may be made.

Computing device 100 includes communications fabric 402, which provides communications between computer processor(s) 404, memory 406, persistent storage 408, communications unit 410, and input/output (I/O) interface(s) 412.

Memory 406 and persistent storage 408 are examples of computer-readable tangible storage devices and media. Memory 406 may be, for example, one or more random access memories (RAM) 414, cache memory 416, or any other suitable volatile or non-volatile storage device.

Smart table handling program 110 is stored in persistent storage 408 for execution by one or more of the respective computer processors 404 via one or more memories of memory 306. In the embodiment illustrated in FIG. 3, persistent storage 408 includes flash memory. Persistent storage 408 may also include storage 117 for storing tabular data files 119. Alternatively, or in addition to flash memory, persistent storage 408 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 408 may also be removable. For example, a removable hard drive may be used for persistent storage 408. Other examples include an optical or magnetic disk that is inserted into a drive for transfer onto another storage device that is also a part of persistent storage 408, or other removable storage devices such as a thumb drive or smart card.

Communications unit 410, in these examples, provides for communications with other data processing systems or devices. In these examples, communications unit 410 includes one or more network interface cards. Communications unit 410 may provide communications through the use of either or both physical and wireless communications links. Smart table handling program 110 may be downloaded to persistent storage 408 through communications unit 410.

I/O interface(s) 412 allows for input and output of data with other devices that may be connected to computing device 100. For example, I/O interface 412 may provide a connection to external devices 418 such as a keyboard, keypad, a touch screen, and/or some other suitable input device. External devices 418 includes user interface 116. I/O interface(s) may also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method comprising:
displaying at least a first displayed portion of a table on a display device, wherein:
the table corresponds to a table data set,
the table includes a plurality of columns, and
each column of the plurality of columns includes a column heading and a plurality of ordered values running in a vertical direction;
receiving a first user input that selects a selected column of the plurality of columns;
for each given column of the plurality of columns other than the selected column, determining a statistical correlation value corresponding to a strength of any statistical correspondence between respective: (i) values of the plurality of ordered values of the selected column, and (ii) values of the plurality of ordered values of the given column, wherein the statistical correlation is represented by a correlation coefficient with a range from −1 to 1;

generating a tag cloud display data set corresponding to a display of a tag cloud including the column headings of the plurality of columns other than the selected column arranged to visually indicate the respective statistical correlation values of the columns to the selected column, wherein the generation of the tag cloud display data set corresponds to a display of a tag cloud where a horizontal orientation or vertical orientation of the display of each displayed column heading corresponds to whether the statistical correlation value for the column corresponding to the displayed column heading is positive or negative;

displaying at least a second displayed portion of the tag cloud display data set on the display device, wherein a first set of dimensions of the tag cloud display data set exceeds a second set of dimensions of the display device;

assigning a set of hyperlinks to the tag cloud display data set, wherein:

each hyperlink in the set of hyperlinks corresponds to a column heading of the plurality of columns, and each hyperlink in the set of hyperlinks links to a secondary tag cloud display data set based, respectively, on a column heading of the plurality of columns;

receiving a second user input that indicates a request to reorder the table into a reorder table based, at least in part, on values in a first column; and displaying at least a third displayed portion of the reorder table on the display device.

2. The computer implemented method of claim 1 wherein the generation of the tag cloud display data set corresponds to a display of a tag cloud where a size of the display of each displayed column heading corresponds to a size of the statistical correlation value for the column corresponding to the displayed column heading.

3. The computer implemented method of claim 1 wherein the generation of the tag cloud display data set corresponds to a display of a tag cloud where a proximity to a center of the tag cloud display of the display of each displayed column heading corresponds to a size of the statistical correlation value for the column corresponding to the displayed column heading.

4. The computer implemented method of claim 1, further comprising:

receiving a third user input that indicates a request to transpose the table into a transpose table; and displaying at least a fourth displayed portion of the transpose table on the display device.

5. The computer implemented method of claim 1, wherein a correlation coefficient of 0 represents a non-linear relationship.

6. A computer implemented method comprising:

displaying at least a first displayed portion of a table on a display device, wherein:

the table corresponds to a table data set, the table includes a plurality of rows, and each row of the plurality of rows includes a row heading and a plurality of ordered values running in a horizontal direction;

receiving a first user input that selects a selected row of the plurality of rows;

for each given row of the plurality of rows other than the selected row, determining a statistical correlation value corresponding to a strength of any statistical correspondence between respective: (i) values of the plurality of ordered values of the selected row, and (ii) values of the plurality of ordered values of the given row, wherein the statistical correlation is a linear association with a range from −1 to 1;

generating a tag cloud display data set corresponding to a display of a tag cloud including the row headings of the plurality of rows other than the selected row arranged to visually indicate the respective statistical correlation values of the rows to the selected rows wherein the generation of the tag cloud display data set corresponds to a display of a tag cloud where a horizontal orientation or vertical orientation of the display of each displayed row heading corresponds to whether the statistical correlation value for the row corresponding to the displayed row heading is positive or negative;

displaying at least a second displayed portion of the tag cloud display data set on the display device, wherein a first set of dimensions of the tag cloud display data set exceeds a second set of dimensions of the display device;

assigning a set of hyperlinks to the tag cloud display data set, wherein:

each hyperlink in the set of hyperlinks corresponds to a row heading of the plurality of rows, and each hyperlink in the set of hyperlinks links to a secondary tag cloud display data set based, respectively, on a row heading of the plurality of rows;

receiving a second user input that indicates a request to reorder the table into a reorder table based, at least in part, on values in a first row; and displaying at least a third displayed portion of the reorder table on the display device.

7. The computer implemented method of claim 6 wherein the generation of the tag cloud display data set corresponds to a display of a tag cloud where a size of the display of each displayed row heading corresponds to a size of the statistical correlation value for the row corresponding to the displayed row heading.

8. The computer implemented method of claim 6 wherein the generation of the tag cloud display data set corresponds to a display of a tag cloud where a proximity to a center of the tag cloud display of the display of each displayed row heading corresponds to a size of the statistical correlation value for the row corresponding to the displayed row heading.

9. The computer implemented method of claim 6, further comprising:

receiving a third user input that indicates a request to transpose the table into a transpose table; and displaying at least a fourth displayed portion of the transpose table on the display device.

10. The computer implemented method of claim 6, wherein a correlation coefficient of 0 represents a non-linear relationship.

11. A computer system comprising:

a set of processor(s);

a computer readable storage medium structured and connected to store machine executable program instructions in a manner so that the program instructions can be executed by the processor set;

wherein the program instructions stored on the set of processor(s) include:

program instructions programmed to display at least a first displayed portion of a table on a display device, wherein:

the table corresponds to a table data set, the table includes a plurality of columns, and each column of the plurality of columns includes a column heading and a plurality of ordered values running in a vertical direction;

program instructions programmed to receive a first user input that selects a selected column of the plurality of columns;

program instructions programmed to, for each given column of the plurality of columns other than the selected column, determine a positive or negative linear relationship value corresponding to a strength of any positive or negative linear relationship between respective: (i) values of the plurality of ordered values of the selected column, and (ii) values of the plurality of ordered values of the given column, wherein the statistical correlation is a linear association with a range from −1 to 1;

program instructions programmed to generate a tag cloud display data set corresponding to a display of a tag cloud including the column headings of the plurality of columns other than the selected column arranged to visually indicate the respective positive or negative linear relationship values of the columns to the selected column, wherein the generation of the tag cloud display data set corresponds to a display of a tag cloud where a horizontal orientation or vertical orientation of the display of each displayed column heading corresponds to whether the linear relationship value for the column corresponding to the displayed column heading is positive or negative;

program instructions programmed to display at least a second displayed portion of the tag cloud display data set on the display device, wherein a first set of dimensions of the tag cloud display data set exceeds a second set of dimensions of the display device;

program instructions programmed to assign a set of hyperlinks to the tag cloud display data set, wherein:

each hyperlink in the set of hyperlinks corresponds to a column heading of the plurality of columns, and each hyperlink in the set of hyperlinks links to a secondary tag cloud display data set based, respectively, on a column heading of the plurality of columns;

program instructions programmed to receive a second user input that indicates a request to reorder the table into a reorder table based, at least in part, on values in a first column; and program instructions programmed to display at least a third displayed portion of the reorder table on the display device.

12. The computer system of claim 11 wherein the generation of the tag cloud display data set corresponds to a display of a tag cloud where a size of the display of each displayed column heading corresponds to a size of the positive or negative linear relationship value for the column corresponding to the displayed column heading.

13. The computer system of claim 11 wherein the generation of the tag cloud display data set corresponds to a display of a tag cloud where a proximity to a center of the tag cloud display of the display of each displayed column heading corresponds to a size of the positive or negative linear relationship value for the column corresponding to the displayed column heading.

14. The computer system of claim 11, further comprising:
program instructions programmed to receive a third user input that indicates a request to transpose the table into a transpose table; and program instructions programmed to display at least a fourth displayed portion of the transpose table on the display device.

15. The computer system of claim 11, wherein a correlation coefficient of 0 represents a non-linear relationship.

\* \* \* \* \*